(12) United States Patent
Huang

(10) Patent No.: US 6,709,145 B1
(45) Date of Patent: Mar. 23, 2004

(54) EXPLODING-LIKE FIREWORK LIGHT

(75) Inventor: Peter K. H. Huang, Taipei (TW)

(73) Assignee: Shining Blick Enterprises Co., Ltd., Taipei (TW)

( * ) Notice: Subject to any disclaimer, the term of this patent is extended or adjusted under 35 U.S.C. 154(b) by 0 days.

(21) Appl. No.: 10/266,762

(22) Filed: Oct. 9, 2002

(51) Int. Cl.⁷ ................................. F21S 4/00
(52) U.S. Cl. ................. 362/565; 362/252; 362/559; 362/806; 40/431
(58) Field of Search ................. 362/551, 554, 362/559, 565, 806, 252, 236, 811, 807, 567, 568, 227; 40/427, 428, 431, 442, 444, 550, 553, 581, 540, 541, 546, 547

(56) References Cited

U.S. PATENT DOCUMENTS

| | | | | |
|---|---|---|---|---|
| 5,031,085 A | * | 7/1991 | Rustin | 362/401 |
| 5,400,534 A | * | 3/1995 | Lin | 40/431 |
| 6,042,242 A | * | 3/2000 | Chang | 362/86 |
| 6,086,220 A | * | 7/2000 | Lash et al. | 362/244 |
| 6,312,141 B1 | * | 11/2001 | Liu | 362/252 |
| D463,588 S | * | 9/2002 | Chao | D26/27 |
| 6,582,115 B2 | * | 6/2003 | Huang | 362/565 |

* cited by examiner

Primary Examiner—Laura K. Tso
(74) Attorney, Agent, or Firm—Troxell Law Office PLLC

(57) ABSTRACT

The exploding-like firework light has a stand for supporting a lamp post to allow flashing forth upwardly from below continuously till the top end thereof, the lamp post has a hollow ball provided on the top thereof; the hollow ball is provided near the center thereof with an internal central flashlight adapted to generating strong flashing in an exploding mode, and a plurality of radiating levers are connected to the hollow ball to provide an effect of radiation outwardly as a firework; the flashlight is controlled and driven by a voltage riser and a relay to make a power source having the voltage thereof dropped control all the other lamp pipes or lamp strings by using a low voltage transformer through a central processing unit. Thereby a safer exploding-like firework light more suitable for outdoor use for a long period and having its packing volume reduced is formed.

3 Claims, 5 Drawing Sheets

EXPLODING-LIKE FIREWORK LIGHT

BACKGROUND OF THE INVENTION

1. Field of the Invention

The present invention is related to an exploding-like firework light, and especially to a firework light having flashing lamp strings with an exploding effect on the top thereof, it can increase safety of use and can reduce its packing volume.

2. Description of the Prior Art

FLAMEWORKS lamps available presently mainly have lamp strings flashing forth upwardly from below continuously, and the top end thereof has a plurality of radiating levers to generate an effect of a firework scattering outwardly. Such FLAMEWORKS lamps generally only have the lamp strings or lamp pipes thereof flashed, they are practically different from the situation that a firework explodes in the first place and then scatters. By the fact that such FLAMEWORKS lamps are principally placed in open areas to generate the effect of brilliant scene and decoration. The decoration effect of the FLAMEWORKS lamps used presently is evidently more different from the fireworks practically played.

U.S. Pat. No. 6,312,141 granted to Liu provides such a FLAMEWORKS lamp; it has an upright firing lamp provided on the top thereof with a supporting ball. The supporting ball is connected with a plurality of radiating levers to make the FLAMEWORKS lamp flash forth upwardly from below after electrically turning on, and to provide a firework scattering effect from the radiating levers of the supporting ball. Such a FLAMEWORKS lamp still can not get the effect assimilating the fireworks practically played.

Thereby, the applicant of the present application filed a patent application Ser. No. 09/906727 relating to a firework light having a flashlight on the top end thereof, and an upright lamp pipe flashing forth upwardly from below continuously and generating an exploding-like flash, and a plurality of radiating levers generating an effect of a firework scattering outwardly. Hence the decoration effect of the firework light can be more like the state of a firework practically played. In this aspect, the decoration effect of the firework light can be elevated.

By the fact that such a firework light has a height of about 1.5 to 3.0 m, the length of each radiating lever is about 0.6 to 1.8 m, and a large one of such firework lights with the required electric members occupies a large volume no matter in shipping or packaging. Thereby, it is a substantial problem to know how to increase the safety of use and to reduce the packing volume of such a firework light to thereby reduce the cost of shipping and increase the convenience of storage.

SUMMARY OF THE INVENTION

The object of the present invention is to provide an exploding-like firework light which is provided with a stand to support a lamp post on which lamp bulbs can flash forth upwardly from below continuously till the top end thereof, a hollow ball is provided on the top end of the lamp post. The hollow ball is provided near the center thereof with an internal central flashlight flashing in an exploding mode, a plurality of radiating levers capable of generating an effect of a firework scattering outwardly are connected to the hollow ball. The flashlight is controlled and driven by a voltage riser and a relay after voltage dropping of a power source to make the power source with the voltage drop control all the other lamp pipes or lamp strings by using a low voltage transformer through a central processing unit, to thereby form a safer exploding-like firework light more suitable for outdoor use for a long period.

In a preferred embodiment of the present invention, the stand can be in the mode of a combination in order to reduce the packing volume of the entire exploding-like firework light.

The present invention will be apparent in its novelty and features after reading the detailed description of the preferred embodiment thereof in reference to the accompanying drawings.

DETAILED DESCRIPTION OF THE PREFERRED EMBODIMENT

Figure 1:
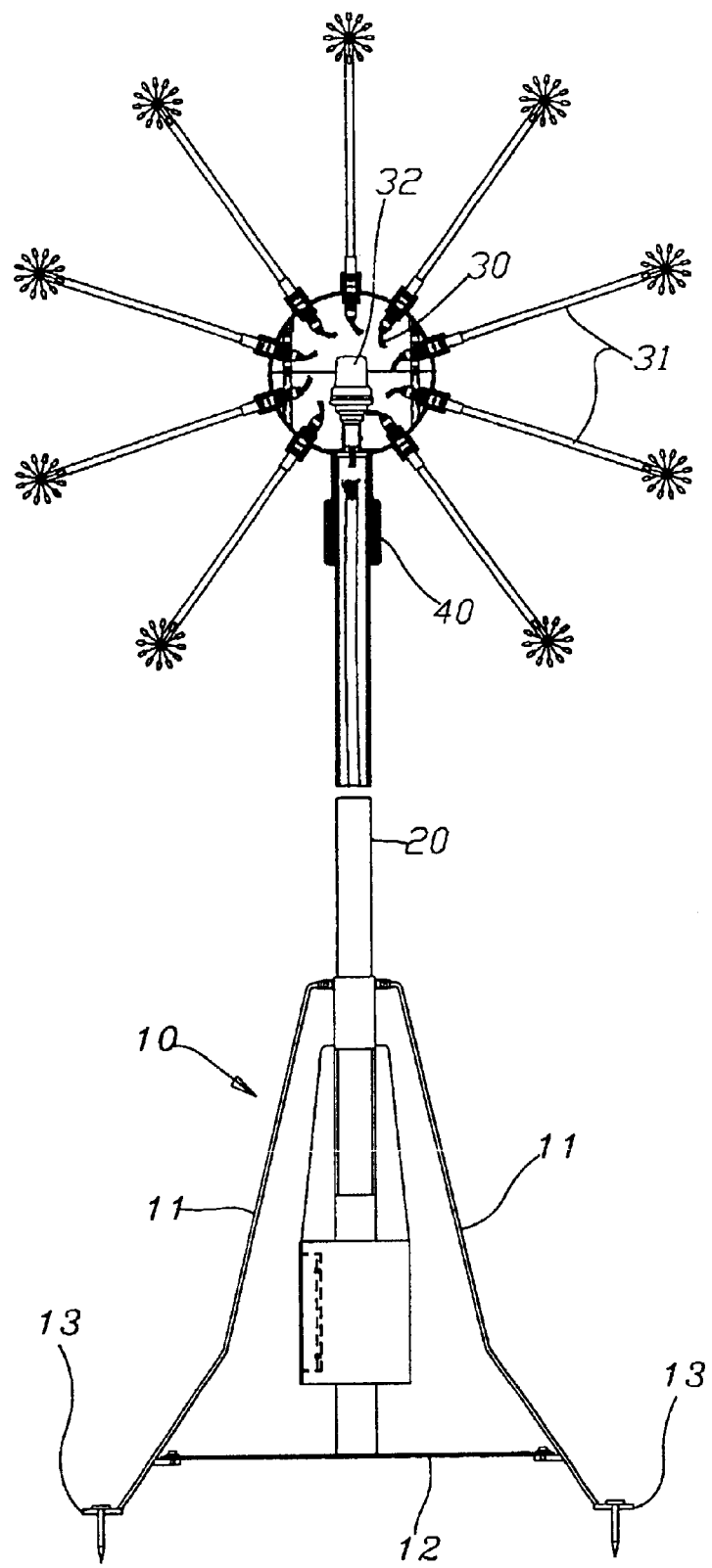
FIG. 1 is a front view of a preferred embodiment of the present invention with the top end of a lamp post in a sectional view.

Referring to FIG. 1 in the first place, the preferred embodiment shown of the present invention has a stand 10 for fixing the entire firework light on the ground in a desired field, and for supporting a lamp post 20 with a predetermined length, a hollow ball 30 is provided on the top end of the lamp post 20. A plurality of radiating levers 31 are connected in advance to the hollow ball 30. The hollow ball 30 is provided near the center thereof with an internal central flashlight 32 capable of generating strong flashing. By electric connection and control, the firework light can flash forth upwardly from below continuously till the top end thereof where the hollow ball 30 is, then the top end flashes in an exploding mode; the radiating levers 31 then radiate with flashing outwardly, so that the decoration effect of the entire firework light can be more like the state of a firework practically played.

Figure 2:
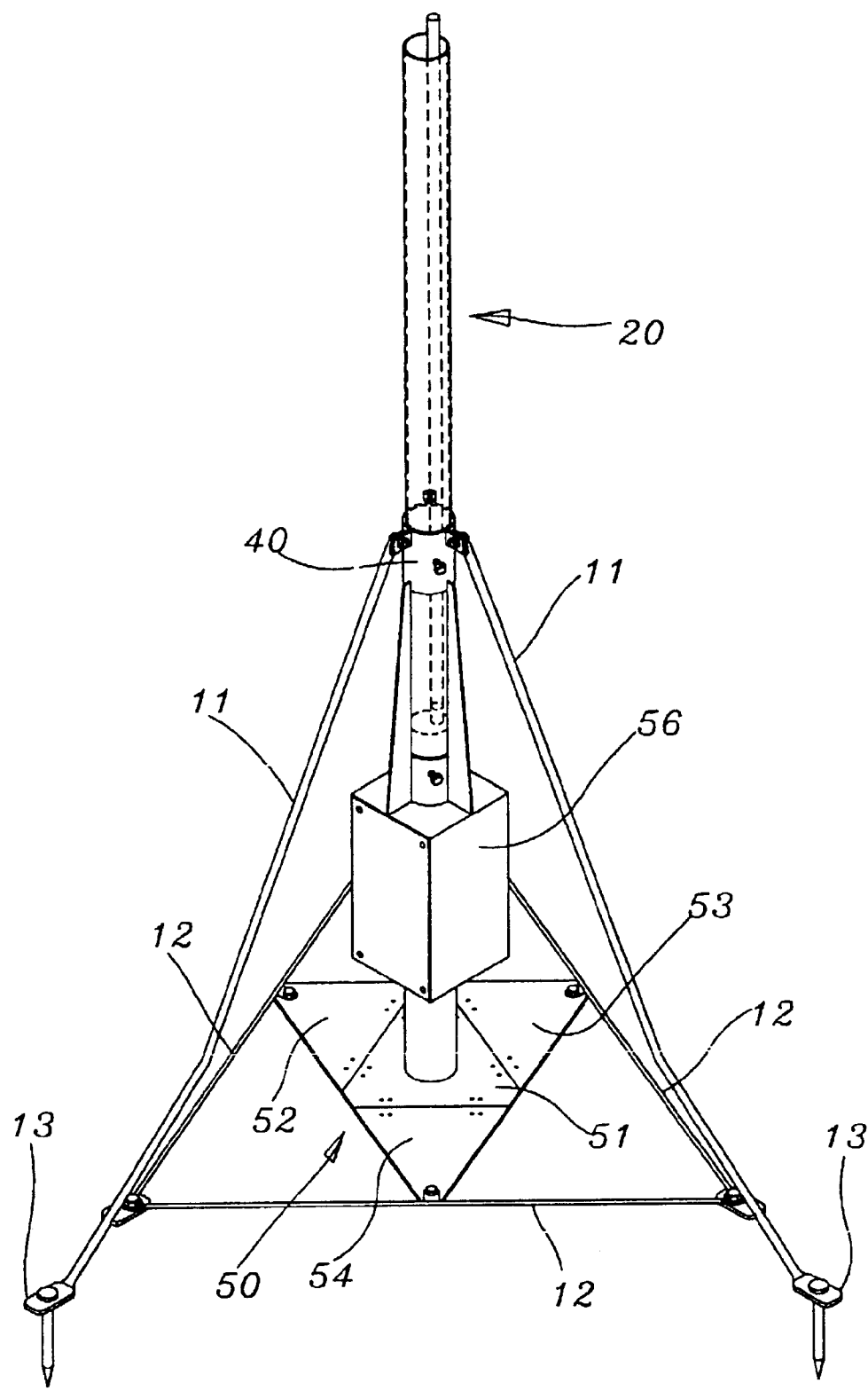
FIG. 2 is an enlarged perspective view of the stand taken from FIG. 1.
Figure 3:
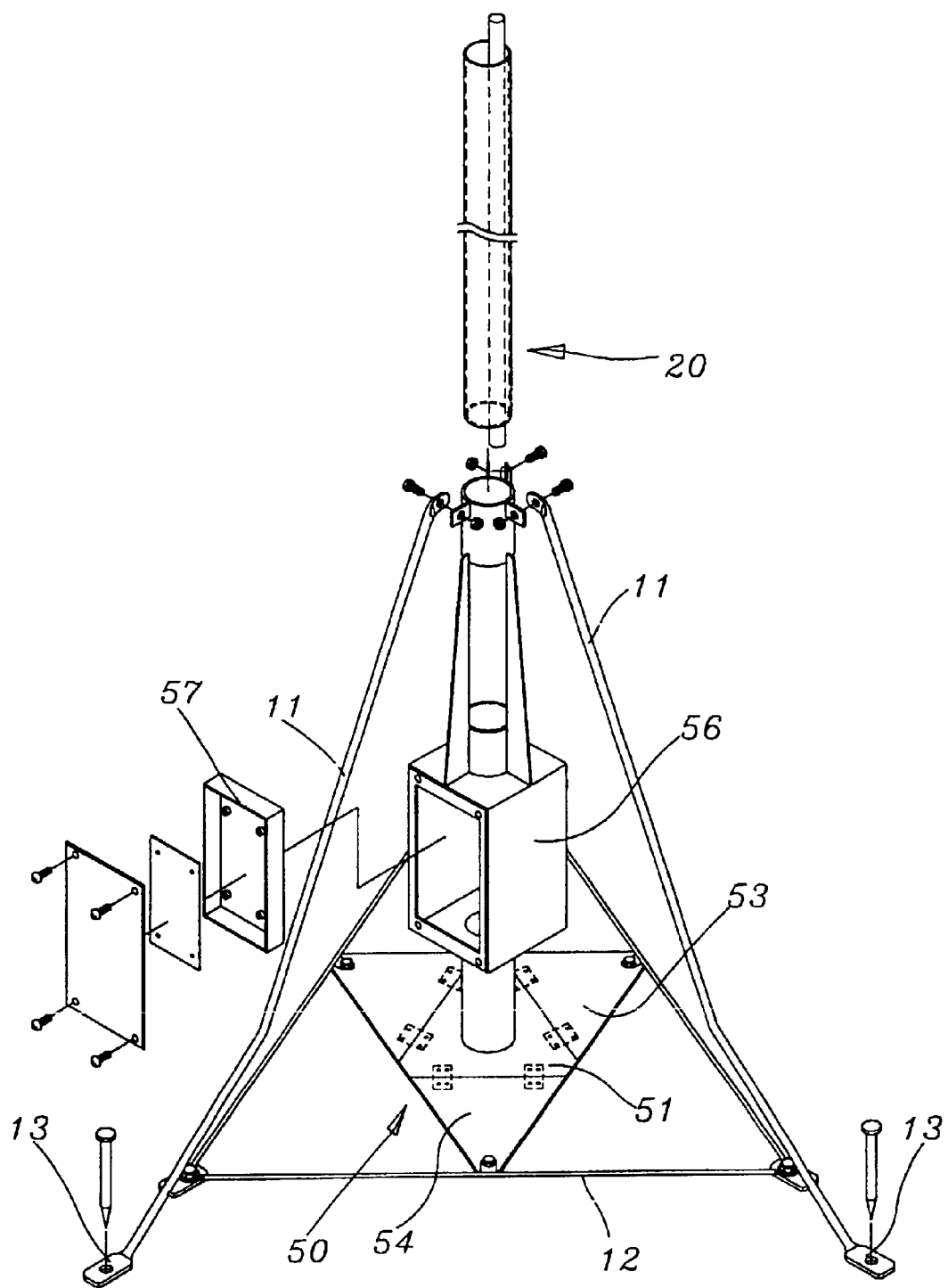
FIG. 3 is an analytic perspective view showing the elements of the stand of FIG. 2.
Figure 4:
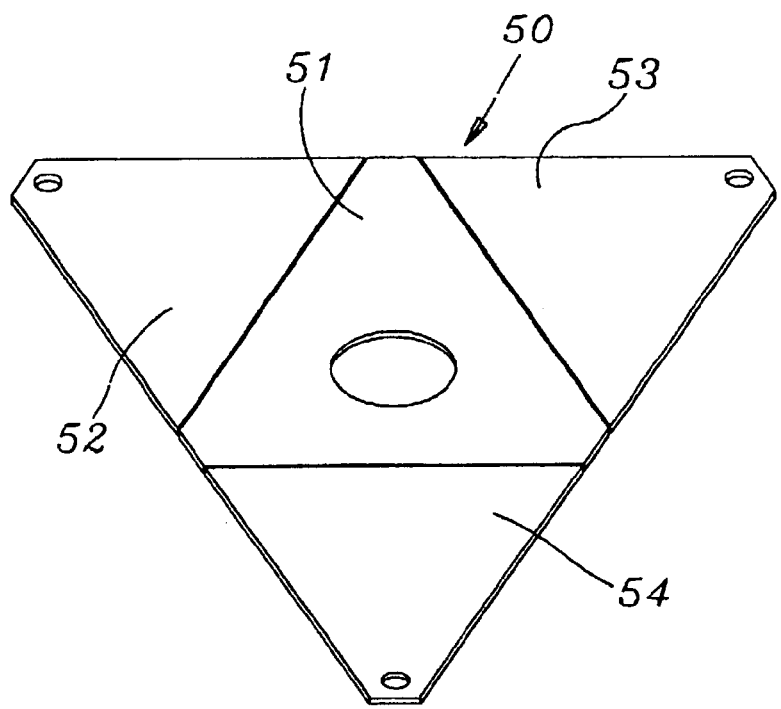
FIG. 4 is a top view of the bottom bracing board of the stand of FIG. 2.
Figure 5:
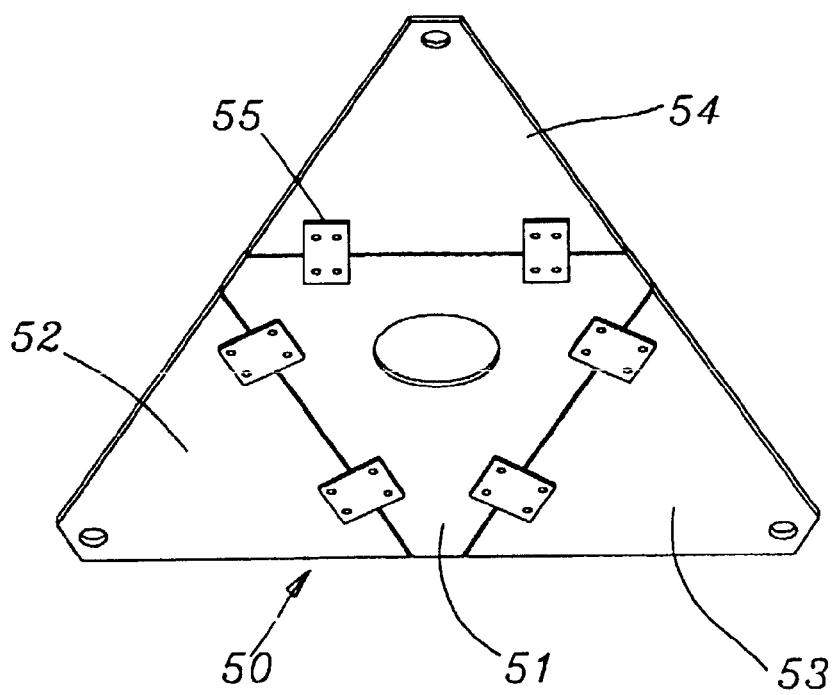
FIG. 5 is a backside view of the bottom bracing board of the stand of FIG. 4.

As shown in FIGS. 2, 3, in the preferred embodiment shown, the stand 10 of the present invention has three main supporting feet 11 arranged each in a bevel mode, the upper ends of the bevel main supporting feet 11 are connected to an annular central collar 40, and the lower ends thereof are fixed on the ground each with an inclined angle. Every two main supporting feet 11 are connected at a level suitably above the ground to a transverse connecting rod 12, so that the three transverse connecting rods 12 form an equilateral triangular frame, and an inversed triangular baseboard 50 can be assembled in the triangular frame for connecting bottom connecting pieces of the lamp post 20. As shown in FIGS. 4, 5, the baseboard 50 can be comprised of a middle board 51 with three connecting edges, and three triangular boards 52, 53 and 54. Each of the triangular boards 52, 53 and 54 has an edge pivotally connected to a corresponding edge of the middle board 51; while one of the three corners of each of them can be connected to the corresponding one of the three transverse connecting rods 12. The junctions respectively between the three triangular boards 52, 53, 54 and the middle board 51 and respectively between the transverse connecting rods 12 and the stand 10 are preferably fixedly locked by connecting using screws in order to be detached conveniently any time. And the grounding ends 13 of the stand 10 are flat to benefit to fixing to the ground with nails.

The transverse connecting rods 12 and the stand 10 thereby are individual rod members before assembling; while the triangular boards 52, 53 and 54 of the baseboard 50 can be mounted with hinges 55 to be able to fold back onto the surface of the middle board 51 to become shorter elements; these can effectively reduce the packing volume of the entire firework light.

Referring to FIGS. 2, 3, in the preferred embodiment of the present invention, the baseboard 50 can be mounted thereabove with an electric box 56. The electric box 56 can be assembled therein with a spaced away box 57 for placing therein the elements such as a transformer.

Figure 6:
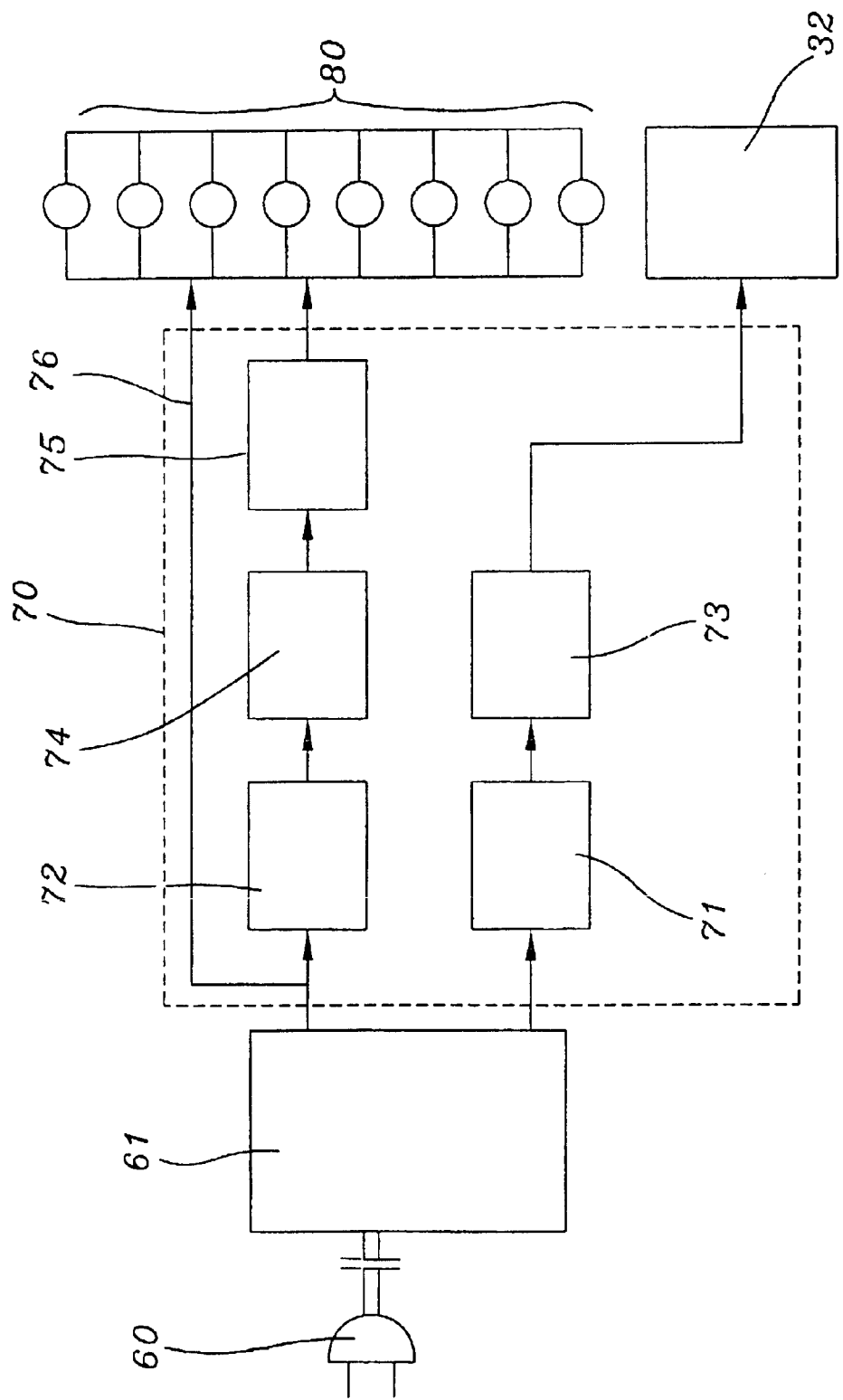
FIG. 6 is an electric flow chart for the preferred embodiment of the present invention.

Referring to FIG. 6, in the electric flow chart for the preferred embodiment of the present invention shown, a power source connected through a power connector 60 has its voltage dropped through a transformer 61, and then is controlled by an IC controller 70 to respectively control a flashlight 32 and all the lamp pipes or lamp strings 80. Taking the 230V power source of the present invention as an example, the transformer 61 can be a 230V/24V transformer, so that it can be respectively connected with a 24V/230V voltage riser 71 and a 24V/6V low voltage transformer 72 in the IC controller 70. The voltage riser 71 thereby can control the flashlight 32 through a relay 73. While the low voltage transformer 72 can control and drive all the lamp pipes or lamp strings 80 through a central processing unit 74 and its connecting and driving unit 75 in cooperation with the power 76 source having been dropped in respect to voltage.

By virtue that such exploding and flashing firework light must be used outdoors for a long period under a higher voltage, the present invention singly uses the voltage riser 71 to control and drive the flashlight 32 in the above stated mode, and controls all the other lamp pipes or lamp strings 80 with a lower voltage; it has higher safety as well as reliability when being operated outdoors for a long period.

The embodiment cited above is only for illustrating a preferred embodiment and not for giving any limitation to the scope of the present invention. It will be apparent to those skilled in this art that various modifications or changes without departing from the spirit and scope of the present invention can be made to and shall fall within the scope of the appended claims of the present invention.

What is claimed is:

1. An exploding-like firework light, having lamp pipers or lamp strings said firework light has a stand for supporting a lamp post to allow flashing forth upwardly from below continuously till the top end thereof, said lamp post has a hollow ball provided on the top thereof; said hollow ball is provided near the center thereof with an internal central flashlight adapted to generating strong flashing in an exploding mode, and a plurality of radiating levers are connected to said hollow ball to provide an effect of radiation outwardly as a firework; a power source connected for said firework light is dropped in respect to voltage and is connected with a controller; said flashlight is controlled and driven by a voltage riser and a relay in said controller to make said power source with the voltage drop control all the other lamp pipes or lamp strings by using a low voltage transformer through a central processing unit.

2. The exploding-like firework light as claimed in claim 1, wherein, said stand has a plurality of main supporting feet arranged each in a bevel mode, the upper ends of said bevel main supporting feet are connected to an annular central collar, and the lower ends thereof are fixed on the ground each with an inclined angle; every two of said main supporting feet are connected at a predetermined level above the ground to a transverse connecting rod, and a baseboard is connected with and within said transverse connecting rods for connecting bottom connecting pieces of said lamp post; said baseboard is comprised of a middle board with a plurality of connecting edges and a plurality of polygonal boards in the same amount as that of said connecting edges; each of said polygonal boards has an edge pivotally connected using hinges to a corresponding edge of said middle board; while one of a plurality of corners of each of said polygonal boards is connected to the corresponding one of said polygonal boards transverse connecting rods; the junctions respectively between said triangular boards and said middle board and respectively between said transverse connecting rods and said stand are fixedly locked by connecting using screws.

3. The exploding-like firework light as claimed in claim 2, wherein, said middle board of said baseboard has three connecting edges, said polygonal boards are triangular boards adapted to folding back onto the surface of said middle board.

* * * * *